March 15, 1966 W. F. ALLER 3,239,939
GAGING APPARATUS

Filed Aug. 8, 1962 9 Sheets-Sheet 1

FIG.1

INVENTOR
W. F. ALLER

BY Edward J. Noz Jr.

HIS ATTORNEY

March 15, 1966     W. F. ALLER     3,239,939

GAGING APPARATUS

Filed Aug. 8, 1962     9 Sheets-Sheet 2

INVENTOR
W. F. ALLER

BY Edward T. Noé Jr.

HIS ATTORNEY

March 15, 1966 W. F. ALLER 3,239,939
GAGING APPARATUS
Filed Aug. 8, 1962 9 Sheets-Sheet 3

FIG.4

INVENTOR
W.F. ALLER
BY Edward T. Noé
HIS ATTORNEY

March 15, 1966  W. F. ALLER  3,239,939
GAGING APPARATUS
Filed Aug. 8, 1962  9 Sheets-Sheet 4

INVENTOR
W. F. ALLER
BY
HIS ATTORNEY

March 15, 1966     W. F. ALLER     3,239,939
GAGING APPARATUS Filed Aug. 8, 1962     9 Sheets-Sheet 6

INVENTOR
W. F. ALLER

BY *Edward J. Hoig*

HIS ATTORNEY

INVENTOR
W. F. ALLER
BY Edward T. Noe
HIS ATTORNEY

March 15, 1966     W. F. ALLER     3,239,939
GAGING APPARATUS Filed Aug. 8, 1962     9 Sheets-Sheet 9

INVENTOR
W.F. ALLER
BY Edward J. Noif Jr.
HIS ATTORNEY

United States Patent Office 3,239,939
Patented Mar. 15, 1966

3,239,939
GAGING APPARATUS
Willis Fay Aller, Dayton, Ohio, assignor to The Sheffield Corporation, Dayton, Ohio, a corporation of Delaware
Filed Aug. 8, 1962, Ser. No. 215,692
9 Claims. (Cl. 33—174)

This invention relates to gaging apparatus, and more particularly to apparatus for the precision measurement of selected points on the interior or exterior surfaces of a hollow object which may be of very substantial size.

In accordance with the present invention, a gaging apparatus is provided capable of completely exploring an object having a size of up to twenty inches or more in height, and of the order of twenty inches in diameter, to determine deviations which might be only a few millionths of an inch from a normal size. In gaging a large inverted cup-shaped article extremely accurate measurements of the whole article and precise measurements of wall thickness at any point can be accomplished.

Such gaging can be obtained automatically under the control of a program tape, or the like, or can be accomplished under manual control if desired.

One embodiment of the invention includes a structural base having a substantially horizontally extending table carrying portion, and a pair of vertically extending slides which are carried by the same slide guides on the base.

One of the slides carries an outwardly extended arm having a gaging stylus on its free end, the arm being supported for movement relative to its respective slide in a substantially horizontal direction, whereby the gaging stylus is adapted to gage the outer peripheral surface of a cup-shaped article or the like disposed on an article-carrying surface of a table carried by the table-carrying portion of the base.

The other slide has a substantially L-shaped arm interconnected thereto and fixed from movement relative thereto, the arm having a first portion thereof extending substantially horizontally from its respective slide and having the other arm thereof extending substantially vertically through the article-carrying surface of the table and being provided with a gaging stylus on the outer free end thereof to gage the internal peripheral surface of the article.

The article-carrying table is adapted to be rotated relative to the base about a substantially verical axis and is adapted to be moved in a horizontal direction relative to the base.

In this manner, it can be seen that the gaging apparatus of this invention is adapted to gage the internal and external peripheral surfaces of a cup-shaped article or the like to determine deviations of the internal and external peripheral surfaces from a pre-selected contour thereof as well as to determine deviations of the wall thickness of the cup-shaped article from a preselected wall thickness by utilizing only two gaging styli in a manner hereinafter described.

Accordingly, it is an object of this invention to provide an improved gaging apparatus having one or more of the novel features set forth above or hereinafter shown or described.

Other objects, uses and advantages of this invention are apparent from a reading of this description which proceeds with reference to the accompanying drawings forming a part thereof and wherein:

While the various features of this invention are hereinafter described and illustrated as being particularly adapted to gage the internal and external peripheral surfaces of a cup-shaped article or the like, it is to be understood that the various features of this invention can be utilized singly or in any combination thereof to gage other articles as desired.

Therefore, this invention is not to be limited to only the embodiment illustrated in the drawings, because the drawings are merely utilized to illustrate one of the wide varieties of uses of this invention.

Figure 1:
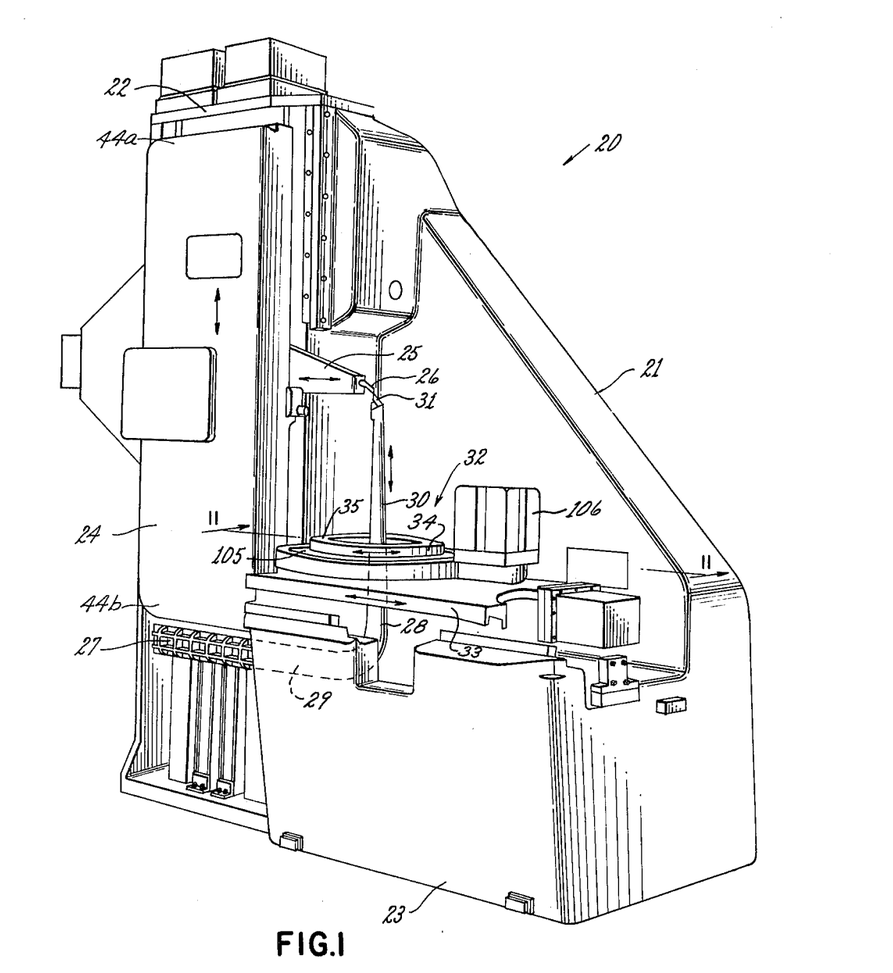
FIGURE 1 is a perspective view of the gaging apparatus of this invention.

Referring now to FIGURE 1, the improved gaging apparatus of this invention is generally indicated by the reference numeral 20.

The gaging apparatus 20 generally comprises a structural base 21 having a substantially vertically extending slide-carrying portion 22 and a substantially horizontally extending table-carrying portion 23.

An outer slide 24 is carried by the slide-carrying portion 22 of the base 21 and is adapted to move relative thereto in a substantially vertical direction, the slide 24 carrying an outwardly extending arm 25 adapted to be moved in a horizontal direction relative to the slide 24 and having a gaging stylus 26 on the outer free end thereof for gaging the outer peripheral surface of a cup-shaped article or the like in a manner hereinafter described.

An inner slide 27 is carried by the slide-carrying portion 22 of the base 21 and is adapted to move in a substantially vertical direction relative thereto, the inner slide 27 carrying a substantially L-shaped arm 28 having a substantially horizontally disposed portion 29 thereof fixed to the inner slide 27 and another portion 30 thereof extending substantially vertically relative to the base 21 and carrying a gaging stylus 31 on the outer free end thereof for gaging the internal peripheral surface of a cup-shaped article or the like in a manner hereinafter described.

The table-carrying portion 23 of the base 21 carries a table structure 32 having a plate-like portion 33 adapted to move in a substantially horizontal direction relative to the base 21 and carrying an annular portion 34 adapted to be rotated relative to the base 21 about a substantially vertical axis and having an article-carrying surface 35.

The arm 28 of the inner slide 27 has the portion 30 thereof extending substantially vertically through the article-carrying surface 35 of the table structure 32 in the manner illustrated in FIGURE 1 whereby the stylus 31 thereof is adapted to gage the inner peripheral surface of a cup-shaped article 36 resting on the article-carrying surface 35 in a manner hereinafter described.

Figure 2:
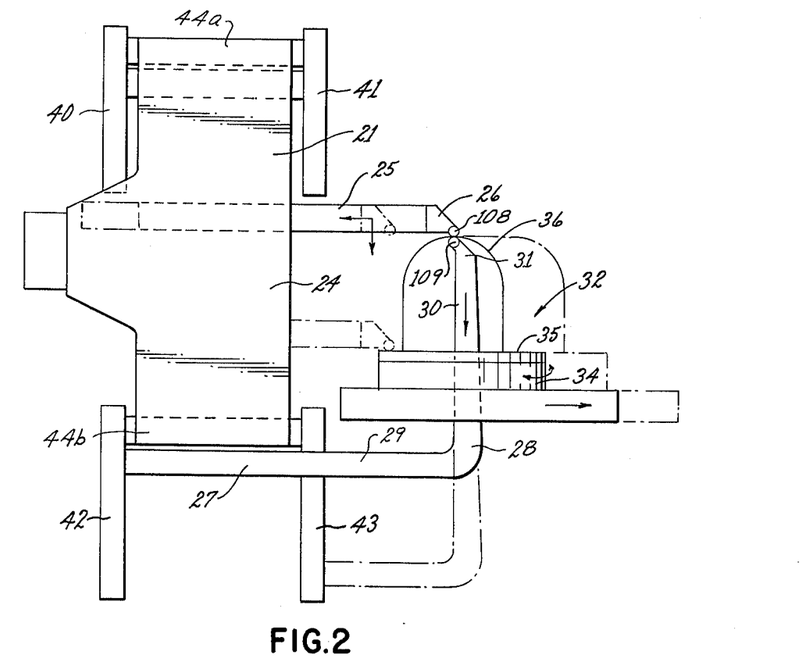
FIGURE 2 is a schematic side view of the gaging apparatus of this invention.
Figure 3:
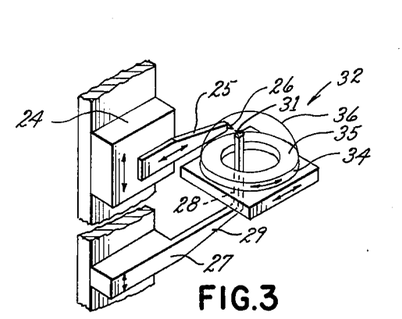
FIGURE 3 is also a schematic perspective view of the gaging apparatus of this invention.

As illustrated schematically in FIGURES 2 and 3, it can be seen that the outer slide 24 is adapted to move in a vertical direction while the arm 25 thereof is adapted to move in a horizontal direction, whereby the arm 25, in combination with the rotational movement of the table portion 34 is adapted to have the gaging stylus 26 thereof gage the entire outer peripheral surface of the cup-shaped article 36 or the like disposed on the article-carrying surface 35 of the table structure 32.

Similarly, the inner slide 27 is adapted to be moved in a vertical direction whereby the arm 28, in combination with the rotary motion and horizontal motion of the table structure 32, is adapted to have the gaging stylus 31 thereof gage the entire inner peripheral surface of the cup-shaped article 36.

Therefore, the gaging apparatus 20 of this invention utilizes five axes of controlled motion to permit two gaging styli to gage the entire outer and inner peripheral surfaces of a cup-shaped article or the like to measure the internal and external deviations thereof from a pre-selected contour thereof as well as the deviations of the wall thickness of the cup-shaped article or the like from a pre-selected wall thickness thereof.

The particular details of the gaging apparatus 20 will now be described.

Figure 4:
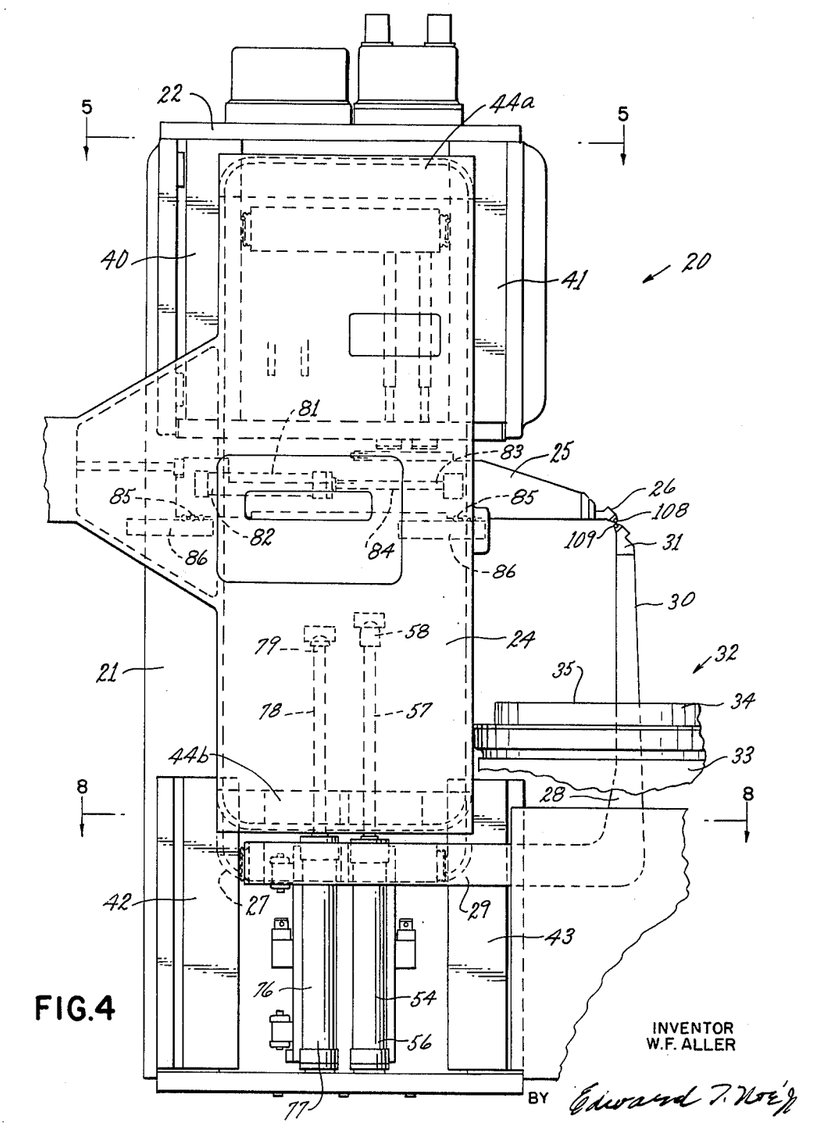
FIGURE 4 is a fragmentary, front view of the gaging apparatus illustrated in FIGURE 1.
Figure 5:
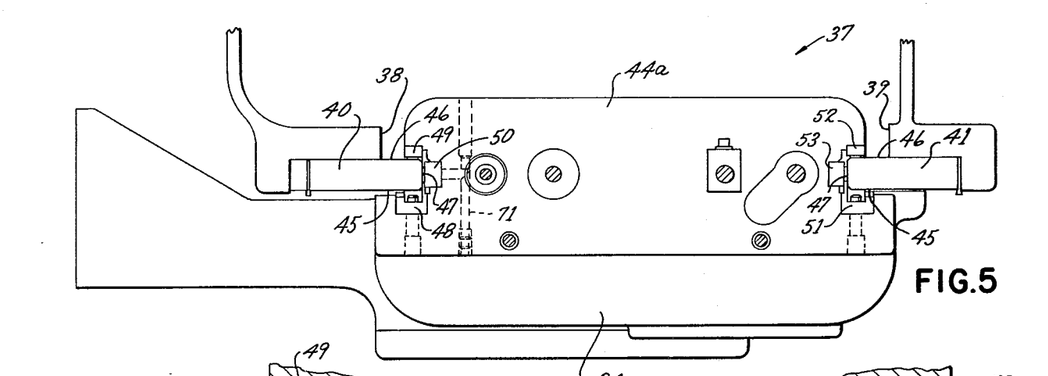
FIGURE 5 is an enlarged, fragmentary, cross-sectional view taken substantially on line 5—5 of FIGURE 4.

Referring now to FIGURES 4 and 5, the slide-carrying portion 22 of the base 21 has a cavity 37 formed therein and defining two opposed inner side walls 38 and 39 thereof.

An upper pair of vertically extending guide means 40 and 41 are respectively secured to the slide-carrying portion 22 of the base 21 and project inwardly from the opposed sides 38 and 39 thereof, the guide means 40 and 41 respectively being disposed at the top of the slide-carrying portion 22 of the base 21.

Similarly, a lower pair of guide means 42 and 43 are carried by the slide-carrying portion 22 of the base 21 and respectively extend inwardly from the sides 38 and 39 thereof in aligned relation with the upper guide means 40 and 41 as illustrated in FIGURE 4.

Figure 4A:
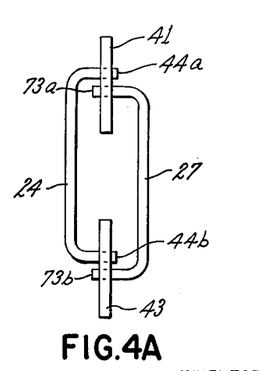
FIGURE 4A is a schematic end view of the structure illustrated in FIGURE 4 and illustrates the guide and slide means thereof.

The outer slide 24 extends between the opposed pairs of guide means 40, 41 and 42, 43 and has top and bottom portions 44a and 44b respectively surrounding the guide means 40–43 in the manner illustrated schematically in FIGURE 4A and by the top portion 44a in FIGURE 5.

Each guide means 40–43 has opposed flat vertically extending surfaces 45 and 46 interconnected by a flat vertical end surface 47 disposed at right angles relative thereto.

The top and bottom portions 44a and 44b of the outer slide 24 each has three left-hand bearing means 48, 49 and 50 respectively disposed in sliding engagement with the surfaces 45–47 of the respective left-hand slide 40 or 42.

Similarly, the right-hand portion of the top and bottom portions 44a and 44b of the outer slide 24 each has three bearing means 51, 52 and 53 disposed in sliding relation with the respective surfaces 45–47 of the top or bottom guide means 41 and 43.

In this manner, the outer guide 24 is vertically movable relative to the slide-carrying portion 22 of the base 21 at the four points provided by the guide means 40–43.

For example, the outer slide 24 can be moved in a vertical direction relative to the slide-carrying portion 22 of the base 21 by hydraulic or pneumatic means illustrated in FIGURE 4 and comprising a cylinder 54 having one end 56 attached to the stationary base 21 and being provided with a piston rod 57 having the free end 58 thereof attached to the outer slide 24.

Therefore, upon movement of the piston 57 relative to the cylinder 54, the outer guide 24 is moved in a vertical direction relative to the base 21.

Figure 6:
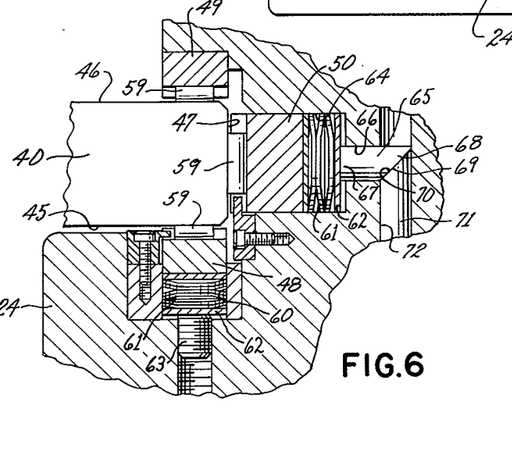
FIGURE 6 is an enlarged, fragmentary, cross-sectional view of the left-hand guide means of the structure illustrated in FIGURE 5.
Figure 7:
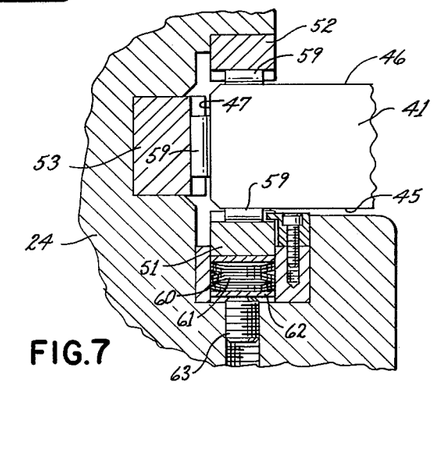
FIGURE 7 is an enlarged, fragmentary, cross-sectional view of the right-hand guide means of FIGURE 5.

As illustrated in FIGURES 6 and 7, the bearing means 49, 52 and 53 at the top portion 44a of the outer slide 24 are fixed relative to the slide 24 and can include roller bearings 59 or the like engaging the respective surfaces 46 and 47 of the guide means 40 and 41.

The bearing means 48 and 51 also include roller bearing means 59 disposed in sliding engagement with the surfaces 45 of the guide means 40 and 41. However, the bearing means 48 and 51 are movable relative to the outer slide 24 in a direction perpendicular to the surfaces 45 of the guide means 40 and 41.

In particular, each bearing means 48 and 51 is disposed for sliding relation in a cavity 60 formed in the slide 24 and is spring pressed outwardly toward the surface 45 of the respective guide means 40 or 41 in any suitable manner.

One such means for urging the bearing means 48 and 51 toward the surface 45 of the guide means 40 and 41 is illustrated in the drawings and comprises a plurality of dished or cup-shaped washers 61 compressed between the respective bearing means 48 and 51 and plate-like members 62 disposed for sliding movement in the cavities 60.

The urging pressure of the washers 61 can be controlled by moving the plates 62 relative to the side 24 by threaded adjusting screws 63.

By spring urging the bearing means 48 and 51 outwardly toward the guide means 40 and 41, the spring means 61 not only urge the bearing means 48 and 51 into sliding contact with surfaces 45 of the guide means 40 and 41, but also the spring means 61 pull the slide 24 forwardly relative to the slide-carrying portion 22 of the base 21 to pull the bearing means 49 and 52 into sliding contact with the surfaces 46 of the guide means 40 and 41.

The bearing means 50 at the top portion 44a of the slide 24 is also spring loaded toward the surface 47 of the left-hand guide means 40 to not only place the roller bearing means 59 thereof into sliding contact with the end surface 47 of the guide means 40 but also to tend to shift the slide 24 to the right to cause the bearing means 53 to be placed in sliding engagement with the end surface 47 of the guide means 41.

In particular, the bearing means 50 is disposed in sliding relation in a cavity 64 formed in the slide 24 and is urged to the left by a plurality of dished or cup-shaped washers 61 in a manner previously described stacked between the bearing means 50 and the plate 62 disposed in the cavity 64.

In order to adjust the spring pressure of the bearing means 50, a shaft 65 is disposed in a bore 66 in the slide 24 and has one end 67 thereof abutting the plate 62 and the other end 68 thereof providing a camming surface 69 which is adapted to be abutted by a camming surface 70 of a rod 71 adjustably disposed in a transverse bore 72 formed in the slide 24.

In this manner, by adjusting the rod 71 relative to its bore 72, the camming surfaces 70 and 69 of the rods 71 and 65 move the rod 65 to the right or to the left to vary the spring force urging the bearing means 50 to the left.

While the bearing means 48–53 at the lower portion 44b of the outer slide 24 can be pressure loaded in the same manner as illustrated in FIGURES 6 and 7, it is to be understood that the same could be opposite thereto if desired.

For example, the lower bearing means 49 and 52 of the slide 24 could be pressure loaded against the surfaces 46 of the lower guide means 42 and 43 while the bearing means 48 and 51 thereof are stationary.

Similarly, the bearing means 53 at the lower end of the vertical slide 24 could be pressure loaded against the end surface 47 of the guide means 43 while the bearing means 50 thereof is stationary relative to the guide means 42 as desired.

In any event, it can be seen that by pressure loading certain of the bearing means of the slide 24 relative to the guide means 40–43, the slide 24 can be held in a fixed aligned position relative to the slide-carrying portion 22 of the base 21 while still permitting vertical movement of the slide 24 relative to the base 21.

The inner slide 27 is formed in substantially the same manner as the outer slide 24 except that the same is disposed on the other side of the guide means 40–43 except at the top and bottom portions 73a and 73b thereof which surround the guide means 40–43 in the same manner as the outer slide 24 except below the respective top and bottom portions 44a and 44b of the outer slide 24 as illustrated schematically in FIGURE 4A.

In this manner, the outer slide 24 must be moved vertically upwardly before the inner slide 27 can be moved vertically upwardly within the limits of vertical movements of the slides 24 and 27.

Similarly, the inner slide 27 must be moved vertically downwardly before the outer slide 24 can be moved vertically downwardly within the limits of vertical movements of the slides 24 and 27.

Figure 8:
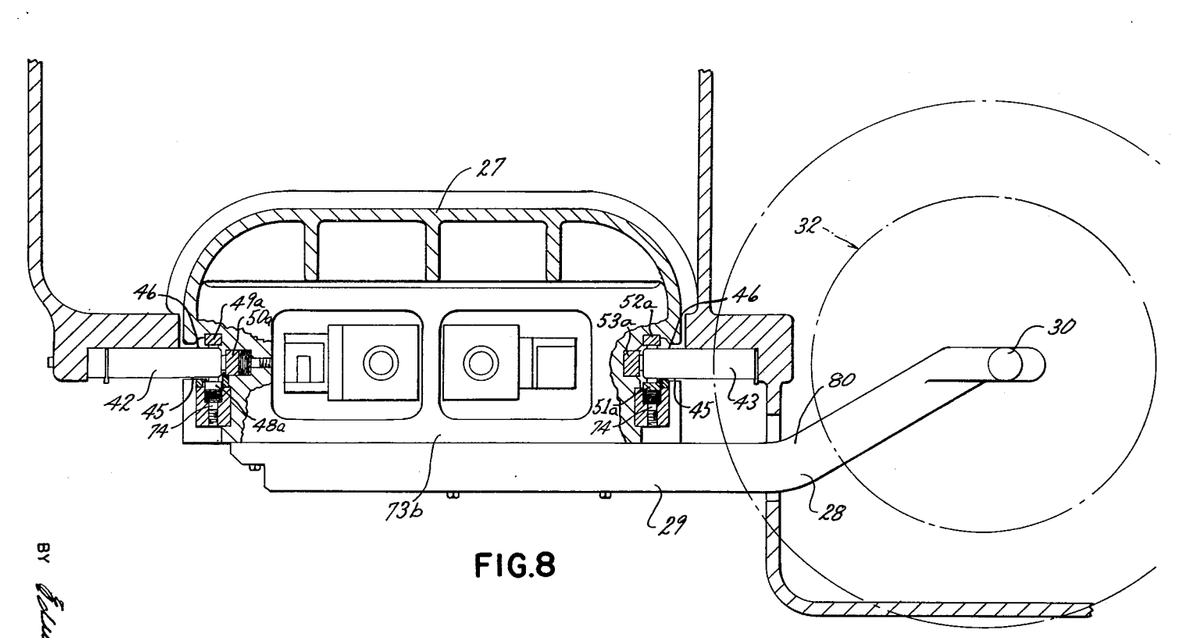
FIGURE 8 is an enlarged, fragmentary, cross-sectional view taken substantally on line 8—8 of FIGURE 4.

As illustrated in FIGURE 8, the inner slide 27 has the bottom portion 73b thereof surrounding the guide means 42 and 43 and being provided with left-hand bearing means 48a, 49a and 50a respectively disposed in sliding relation with the surfaces 45, 46 and 47 of the guide means 42 and with right-hand bearing means 51a, 52a and 53a respectively disposed in sliding relation with the surfaces 45, 46 and 47 of the guide means 43 in the manner previously described.

Figures 9, 15:
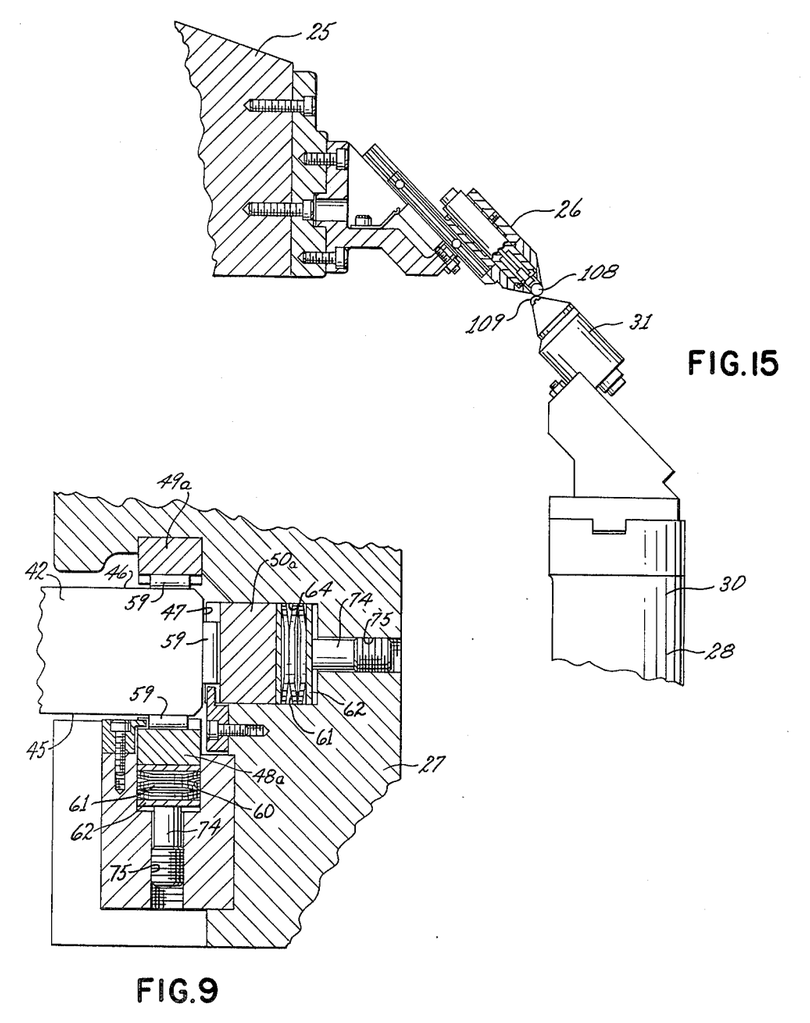
FIGURE 9 is an enlarged, fragmentary, cross-sectional view of the left-hand guide means of the structure illustrated in FIGURE 8.
FIGURE 15 is an enlarged, fragmentary, partial cross-sectional view of the gaging styli of this invention.
Figure 10:
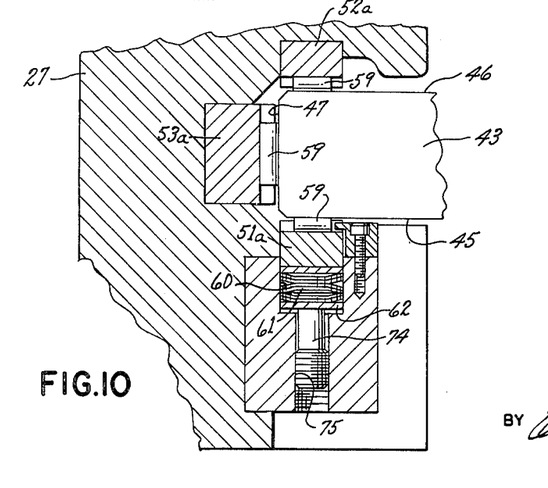
FIGURE 10 is an enlarged, fragmentary, cross-sectional view of the right-hand guide means of the structure illustrated in FIGURE 8.

In the manner similar to the bearing means for the outer slide 24, the bearing means 48a, 50a and 51a of the inner slide 27 are pressure loaded in the same manner as the comparable bearing means of the outer slide 24 as illustrated respectively in FIGURES 9 and 10 whereby the details thereof will not be described as like reference numerals are utilized for like parts illustrated in FIGURES 6 and 7 and previously described.

However, the adjusting means for the spring pressure of the bearing means 50a of the lower or the inner slide 27 comprises a member 74 as illustrated in FIGURE 9 which is threadedly disposed in a bore 75 of the slide 27 to vary the position of the plate 62 relative to bearing means 50a.

Similarly, the adjusting means for the bearing means 48a and 51a of the inner slide 27 are adjusted by rods 74 threadedly disposed in the bores 75 as illustrated in FIGURES 9 and 10.

The upper portion 73a of the inner slide 27 can have the bearing means 49a–53a thereof pressure loaded in the same manner as the lower bearing means 49a–53a thereof as desired or the same can be oppositely disposed in the same manner as previously described for the outer slide 24.

In any event, it can be seen that the inner slide 27 is also properly located relative to the guide means 40–43 while still being movable in a vertical direction relative thereto.

In particular, the inner slide 27 can be moved vertically by hydraulic or pneumatic means.

For example, a cylinder 76, FIGURE 4, has one end 77 thereof secured to the base 21 and is provided with a piston rod 78 having the free end 79 thereof secured to the inner slide 27 whereby the inner slide 27 is moved vertically upon movement of the piston rod 78 relative to the cylinder 76.

As illustrated in FIGURE 8, the arm 28 has the horizontal portion 29 thereof secured to the lower portion 73b of the inner slide 27, the horizontal portion 29 of the arm 28 being angled at 80 to permit the vertical portion 30 thereof to project centrally through the table structure 32 in a manner hereinafter described.

As illustrated in FIGURE 4, the arm 25 of the outer slide 24 is adapted to be movable relative to the slide 24 in a horizontal direction by any suitable means.

For example, a pneumatic or hydraulic cylinder 81 is provided and has an end 82 thereof secured to the slide 24 whereby the free end 83 of the piston rod 84 is secured to the arm 25 to effect horizontal movement of the arm 25 relative to the slide 24 upon movement of the piston rod 84 relative to the cylinder 81.

The arm 25 is movable on bearing means 85 disposed between the arm 25 and guide means 86 of the slide 24.

Similarly, the arm 25 can be held against the rear surface of the slide 24 by any suitable pressure loaded bearing means or the like whereby the arm 25 can be accurately guided relative to the slide 24 in a manner similar to the slides 24 and 27 relative to the base 21.

Figure 11:
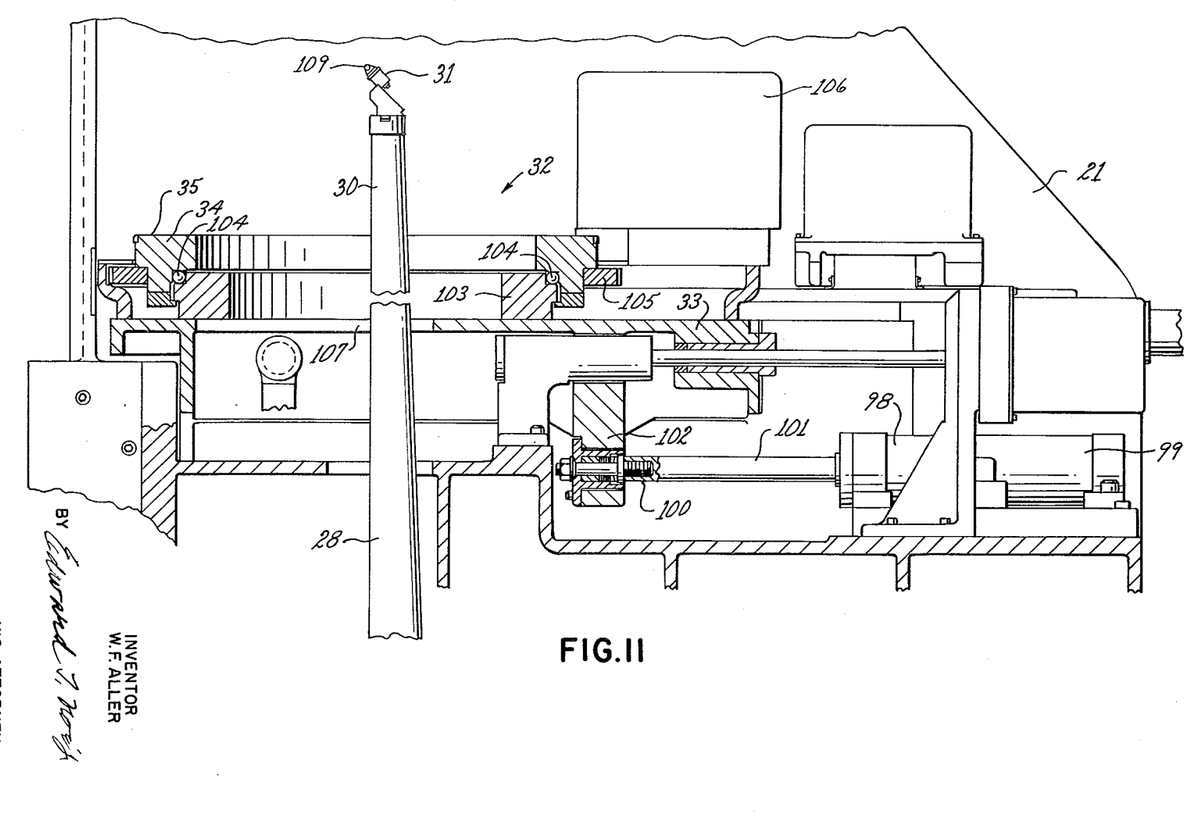
FIGURE 11 is an enlarged, fragmentary, cross-sectional view of the table-carrying portion of the apparatus illustrated in FIGURE 1 and is taken substantially on line 11—11 thereof.
Figure 12:
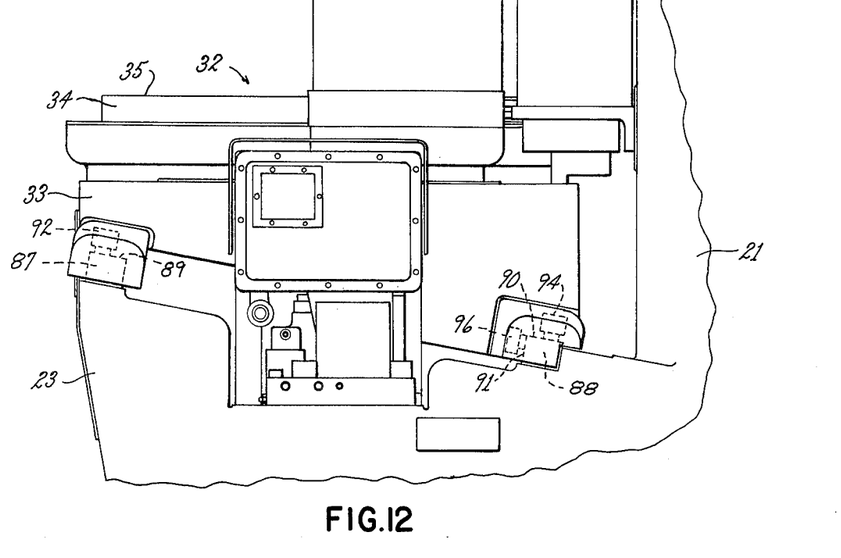
FIGURE 12 is a fragmentary end view of the table-carrying portion of the apparatus illustrated in FIGURE 1.
Figure 13:
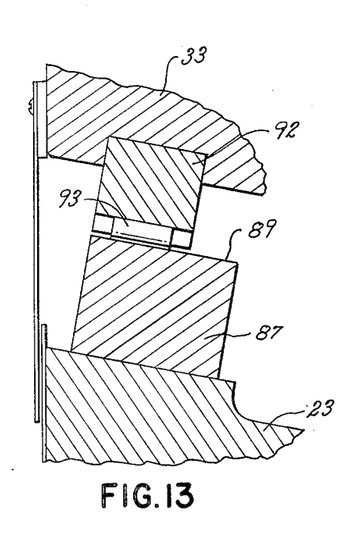
FIGURE 13 is an enlarged, fragmentary schematic view of the left-hand side portion of the structure illustrated in FIGURE 12.
Figure 14:
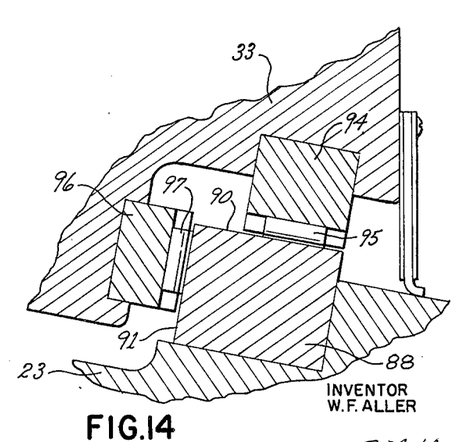
FIGURE 14 is an enlarged, fragmentary, schematic view illustrating the right-hand sliding portion of the structure illustrated in FIGURE 12.

As illustrated in FIGURE 11, the table structure 32 includes the horizontally movable portion 33 mounted for horizontal movement along a pair of substantially horizontally disposed guide members 87 and 88, FIGURES 12–14, carried by the horizontal portion 23 of the base 21.

In particular, the horizontal guide member 87, FIGURE 13, has an upper flat surface 89 disposed at an angle relative to the horizontal while the guide member 88 has a like upper flat surface 90 sloping relative to the horizontal and has a surface 91 disposed transversely relative thereto.

The horizontally movable portion 33 of the table structure 32 carries a bearing means 92 that includes roller bearing means 93 adapted to rest on the flat surface 89 of the guide means 87 whereby the table portion 33 is adapted to slide horizontally on the surface 89 of the guide member 87 as well as to slide transversely relative to the guide member 87 to the right by the force of gravity as illustrated in FIGURES 12–14.

The table portion 33 also carries a similar bearing means 94 having rollers 95 adapted to rest on the surface 90 of the guide member 88 to permit horizontal movement of the table portion 33 relative to the guide member 88 as well as transverse sliding movement relative thereto to the right as illustrated in the drawings.

To limit sideways sliding movement of the table structure 32 relative to the guide means 87 and 88, the table portion 33 includes another bearing means 96 having rollers 97 adapted for engagement with the transverse surface 91 of the guide member 88 whereby the table portion 33 is adapted to slide to the right on the surfaces 89 and 90 of the guide members 87 and 88 until the bearing means 96 abuts the surface 91 of the guide means 88.

In this manner, the table structure 32 is properly positioned relative to the base 21 of the gaging apparatus 20 and is adapted to move horizontally relative thereto because the bearing means 92, 94 and 96 respectively slide on the surfaces 89, 90 and 91 of the guide members 87 and 88 in the above manner.

As illustrated in FIGURE 11, the table structure 32 is adapted to be moved in a horizontal direction relative to the base 21 in any suitable manner.

For example, a hydraulic or pneumatic cylinder 98 is provided and has one end 99 thereof secured to the base 21 with the free end 100 of the piston rod 101 thereof interconnected to a depending part 102 of the table portion 33.

Thus, upon movement of the piston rod 101 relative to the cylinder 98, the table structure 32 is moved horizontally relative to the base 21.

The table portion 33 carries an annular member 103 which rotatably mounts the rotatable table portion 34 on bearing means 104.

The annular table portion 34 is interconnected to a ring gear 105 adapted to be rotated by a suitable gear train (not shown) under the control of a hydraulic or pneumatic motor mounted in a control device 106 secured to the table portion 33 whereby the means for rotating the table portion 34 is adapted to move horizontally with the table portion 33 to permit rotational movement of the table portion 34 while the same is moving in a horizontal direction.

The table portion 33 is provided with an elongated slot 107 receiving the portion 30 of the arm 28 so that the portion 30 of the arm 28 can project vertically upwardly through the article-carrying surface 35 of the table structure 32 and permit the table structure 32 to be horizontally moved relative to the arm 28, the table structure 32 being shown in its full left-hand position in FIGURE 11 whereby the table structure 32 is adapted to move horizontally to the right from the position illustrated in FIGURE 11 within the limits of the slot means 107 thereof.

As illustrated in FIGURE 15, the gaging styli 26 and 31 respectively have ball-shaped ends 108 and 109 which are adapted to move relative to the styli structure 26 and 31 in directions disposed at an angle of approximately 45° relative to the horizontal.

For example, should the arm 25 be moved to a particular position relative to the cup-shaped article 36 so that the ball end 108 of the stylus 26 thereof should be engaging the outer peripheral surface of the article 36 in a position to give no signal and there is an error in the outer peripheral surface at that point, such as an outward projection thereon, the ball end 108 of the stylus 26 would be moved upwardly at an angle of 45° relative to the horizontal to send a signal indicating that there is a deviation from the desired structure of the article 36 and the signal from the stylus 26 may indicate the amount of such deviation.

The stylus 31 also functions in a like manner.

Such signal sending means of the styli 26 and 31 is a well known structure in the art and the same can measure the deviation electrically or by air-flow sensing means or the like.

For example, see the United States patent to Jeglum, No. 2,833,046, issued May 6, 1958, wherein such an electromagnetic gage head is disclosed and claimed, for specific details of the parts and operation of the styli 26 and 31 of this invention.

By mounting the ball ends 108 and 109 of the styli 26 and 31 to move on axes disposed at 45° relative to the horizontal, the styli 26 and 31 are capable of providing measurement of a total arc of 90° minimum.

However, because of the diameter of the balls 108 and 109 or because of the article configuration exceeding the 90° envelope requirements, the gage heads or styli 26 and 31 can be removed and replaced with other units wherein the angular relation is something other than 45° to the horizontal, as desired.

While the hydraulic or pneumatic means for moving the various slides 24 and 27, arm 25, horizontal table portion 33 and rotational table portion 34 can be controlled manually or automatically to cause the gaging styli 26 and 31 and article 36 to be indexed to the proper positions thereof, the embodiments thereof illustrated in the drawings are automatically controlled by a program tape which moves the moving parts of the gaging apparatus 20 in one of two methods.

In particular, one such method comprises a tape controlled scanning method wherein each gage styli 26 and 31 is sequentially positioned in accordance with the commands of the tape. Upon completion of the positioning of the gage styli 26 and 31 under the control of the program tape, the object 36 is rotated at a preset rate under the control of the program tape. Should the dimensional measurements of deviation of the article 36 exceed pre-set limits, rotation of the table structure 32 stops and position and deviation of the article is printed on a recording tape to record the error. The pre-set increment of motion of the table structure 32 is established by the operator on the control panel of the gaging apparatus 20. The rotary table structure 32 proceeds automatically in the above manner until the object deviations are within the pre-set deviation limits. When the object being gaged is within the pre-set deviation limits, rotation thereof continues until the rotary table structure 32 returns to zero or home position.

Thereafter, the gaging styli 26 and 31 are moved to a new position thereof and the table structure 32 is again rotated in the above manner.

In another method of operation, known as the tape control increment mode, each gaging stylus 26 and 31 is sequentially positioned in accordance with the commands of the program tape. Upon completion of the positioning of the gage styli 26 and 31, the article 36 is rotated in accordance with the command of the tape. When the rotary position of the table structure 32 has reached the angular position commanded by the tape, rotation stops and gage deviation and position are printed on the recording tape. Under this method of operation, pre-set limits outlined above under the tape control scanning method, are ignored and the gaging apparatus 20 follows strictly the commands of the tape control. When it is desired to prohibit the styli 26 and 31 from contacting the part 36 during rotary motions of the table structure 32, appropriate programming of the slides 24 and 27 during rotary movement of the table structure 32 can be incorporated onto the control tape.

While any suitable means can be controlled by the control tape to operate the hydraulic or pneumatic means of the slides 24 and 27, arm 25, table portion 33 and table portion 34, one such method is illustrated schematically in FIGURE 16 and will now be described.

Figure 16:
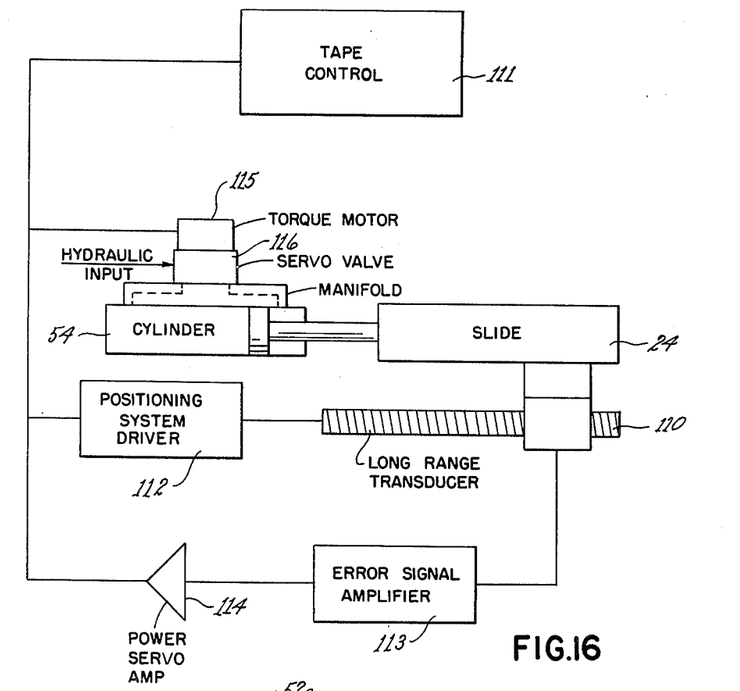
FIGURE 16 is a schematic view illustrating one control means for moving the various moving parts of the gaging apparatus of this invention.

As illustrated in FIGURE 16, a separate transducer 110 is provided for each movable part, such as the slide 24 as illustrated in FIGURE 16, wherein movement of the signaling device of the transducer 110 is under the influence of the tape control mechanism 111 and causes a signal to operate the particular hydraulic or pneumatic cylinder 54 to position the slide 24 to the selected position thereof.

For example, the tape control 111 sends a signal to the positioning system driver 112 which tells the long range transducer 110 to what position the slide 24 should be in relation to the base 21.

Since the slide 24 is in a position other than in the required position of the positioning system driver 112, the long range transducer generates an output error signal which is amplified by amplifier 113 and transmitted to the power servo amplifier 114 to operate a torque motor 115 to open a servo valve 116 in the proper direction whereby the hydraulic cylinder 54 is operated in the proper direction to cause the slide 24 to move to the position selected by the tape control 111.

When the slide 24 has been moved to the proper position, the long range transducer no longer sends an error signal to the amplifier 113 whereby the servo valve 116 closes and holds the cylinder 54 in the proper position thereof.

While the particular details and operation of the transducers 110 for controlling movement of the various movable parts of the gage apparatus 20 are not set forth, such transducers 110 are well known in the art and further details thereof can be obtained by referring to the United States patent to Brouwer, No. 2,913,648, issued November 17, 1959.

Therefore, it can be seen that the slides 24 and 27, arm 25, table portion 33 and table portion 34 can be automatically controlled by hydraulic or pneumatic means to properly position the respective part in a desired relation relative to the base 21 to permit the gaging styli 26 and 31 to measure the article 36 at the proper position thereof.

Therefore, the gaging apparatus 20 of this invention can be controlled automatically by a program tape that causes the gaging styli 26 and 31 to gage the entire internal and external peripheral surfaces of the cup-shaped article 36, the gaging styli 26 and 31 being adapted to record internal and external peripheral deviations as well as wall thickness deviations on a recording tape or the like whereby a complete cup-shaped article can be gaged automatically by merely the two gaging styli 26 and 31.

While the movement of the parts of the gaging apparatus 20 of this invention has been described as being under the automatic control of a pre-set program tape, it is to be understood that the various parts of the apparatus 20 can be moved by manually controlling the operation of the hydraulic or pneumatic actuators, as desired.

From the above description, it is apparent that in order to gage the article 36 having a height of approximately twenty inches and a diameter of approximately twenty inches, the slides 24 and 27, arm 25 and table portion 33 must move through relatively large vertical and horizontal distances while still being accurately guided to measure deviations in the order of a few millionths of an inch.

The above accuracy feature necessitates having the upper and lower pairs of guide means 40, 41 and 42, 43 widely spaced from each other a distance several times the length of movement of the arms 25 and 28 to permit accurate positioning of the slides 24 and 27 relative to the base 21 whereby the weights of the slides 24 and 27 are relatively large.

However, since the slides 24 and 27 are mounted for vertical movement on the same guide means 40–43 and are spring biased thereagainst in the above manner, the massive weights of the slides 24 and 27 do not tend to cock the slides 24 and 27 relative to the base 21 whereby the slides 24 and 27 can move accurately through relatively large vertical distances to gage a relatively large article 36 while still permitting the gaging styli 26 and 31 to measure deviations in the order of a few millionths of an inch.

Similarly, by mounting the table portion 33 of the table structure 32 for horizontal movement relative to the base 21, the table structure 32 can be accurately moved through relatively large distances to permit gaging of the relatively large article 36 even though the weight of the table structure 32 is relatively large to permit the proper movement of the table structure 32 because the weight of the table structure 32 permits the table structure 32 to be held in the proper position thereof relative to base 21 on the guide means 87 and 88 previously described.

Therefore, it can be seen that the gaging apparatus 20 of this invention provides for accurate movement of the gaging styli 26 and 31 and article 36 through a unique arrangement of the slides 24 and 27 and the table structure 32 on the respective guide means 40–43 and 88, 89, even though the slides 24 and 27 and table structure 32 are relatively massive and must move through relatively large distances to permit the gaging of a relatively large article 36, whereby the gaging styli 26 and 31 are adapted to measure deviations in the order of a few millionths of an inch.

While the form of the invention now preferred has been disclosed as required by the statutes, other forms may be used, all coming within the scope of the claims which follow.

What is claimed is:

1. Gaging apparatus comprising,
a base carrying extended guide surfaces and having an article carrying surface,
a first slide carried by said base and being movable relative thereto along and in guiding engagement with said guide surfaces in opposed directions,
a second slide carried by said base and being movable relative thereto along and in guiding engagement with said guide surfaces in said opposed directions,
guiding means cooperating between said first slide and said guide surfaces at first and third relatively spaced locations therealong,
guiding means cooperating between said second slide and said same guide surfaces at second and fourth locations therealong, said second location being between and said fourth location being outside said first and third locations, whereby said slides are guided by intermeshing guiding means respectively cooperating closely with the same portions of the same guide surfaces,
a first arm carried by said first slide and having a gaging stylus for gaging one side of an article disposed on said article-carrying surface,
and a second arm carried by said second slide and having a gaging stylus for gaging the other side of said article.

2. Gaging apparatus comprising,
a base carrying two pairs of parallel extended guide surfaces and having an article-carrying surface,
a first slide carried by said base and being movable relative thereto along both pairs of guide surfaces in opposed directions,
a second slide carried by said base and being movable relative thereto along both pairs of guide surfaces in said opposed directions,
guiding means cooperating between each end of said first slide and a respective pair of said guide surfaces respectively at first and third relatively widely spaced locations therealong,
guiding means cooperating between each end of said second slide and a respective pair of said guide surfaces respectively at second and fourth locations therealong, said second locations being between and said fourth locations being outside said first and third locations and said first and second guiding locations lying on one pair of said guide surfaces and said third and fourth guiding locations lying on the other pair of said guide surfaces, whereby said slides are supported by intermeshing guiding means respectively cooperating closely with the same portions of the same guide surfaces,
a first arm carried by said first slide and having a gaging stylus for gaging one side of an article disposed on said article-carrying surface,
and a second arm carried by said second slide and having a gaging stylus for gaging the other side of said article.

3. Gaging apparatus comprising,
a base having an article-carrying surface, said base carrying longitudinally extended guide surfaces,
a first slide carried by said base and being movable relative thereto along said guide surfaces in opposed directions by guiding association therewith at widely spaced guiding locations therealong,
a second slide carried by said base and being movable relative thereto along said guide surfaces in said opposed directions by guiding association therewith at widely spaced guiding locations therealong,
a gaging plane fixed relative to said base including therein said longitudinally extended guide means and said guiding locations,
a first arm carried by said first slide and extending therefrom in a direction transverse to said opposed directions and said guide surfaces and along said gaging plane,
a first gaging stylus for gaging the outside periphery of any article disposed on said article-carrying surface, said first stylus having a gaging element for association with the article being gaged responsive to displacement of the article surface relative to said first stylus along a given line of gaging for sensing deviations along this given line, means fixedly mounting said first stylus on said first arm disposing said stylus and its line of gaging within said fixed gaging plane, a second arm carried by said second slide and having a second gaging stylus for gaging the inside periphery of said article, said second stylus having a gaging element for association with the article being gaged responsive to displacement of the article surface relative to said second stylus along a given line of gaging for sensing deviations along this given line, and means fixedly mounting said second stylus on said second arm disposing said second stylus and its line of gaging within said fixed gaging plane, whereby through said widely spaced guiding locations within said gaging plane maximum accuracy of stylus positioning is achieved.

4. Gaging apparatus comprising, a base having an article-carrying surface, said base carrying longitudinally extended parallel guide surfaces, a first slide carried by said base and being movable relative thereto along said parallel guide surfaces and in opposed directions by guiding association therewith at widely spaced guiding locations therealong, a second slide carried by said base and being movable relative thereto along said parallel guide surfaces and in said opposed directions by guiding association therewith at widely spaced guiding locations therealong, a fixed gaging plane determined by and including therein said parallel longitudinally extended guide means and said guiding locations, a first arm carried by said first slide and extending therefrom in a direction transverse to said opposed directions and said parallel guide surfaces and along said gaging plane, a first gaging stylus for gaging the outside periphery of an article disposed on said article-carrying surface, said first stylus having a gaging element for association with the article being gaged responsive to displacement of the article surface relative to said first stylus along a given line of gaging for sensing deviations along this given line, means fixedly mounting said first stylus on said first arm disposing said stylus and its line of gaging within said fixed gaging plane, a second arm carried by said second slide and having a second gaging stylus for gaging the inside periphery of said article, said second stylus having a gaging element for association with the article being gaged responsive to displacement of the article surface relative to said second stylus along a given line of gaging for sensing deviations along this given line, and means fixedly mounting said second stylus on said second arm disposing said second stylus and its line of gaging within said fixed gaging plane, whereby through said widely spaced guiding locations within said gaging plane maximum accuracy of stylus positioning is achieved.

5. Gaging apparatus comprising, a base having an article-carrying surface, said base carrying two pairs of parallel longitudinally extended guide surfaces, a first slide carried by said base and being movable relative thereto along both pairs of guide surfaces in opposed directions, one end of said first slide being in guiding association with one pair of guide surfaces and the other end of said first slide being in guiding association with the other pair of guide surfacees at widely spaced apart guiding locations, a second slide carried by said base and being movable relative thereto along both pairs of guide surfaces in said opposed directions, one end of said second slide being in guiding association with said one pair of guide surfaces adjacent the corresponding end of said first slide and the other end of said second slide being in guiding association with said other pair of guide surfaces adjacent the corresponding end of said first slide at said widely spaced apart guiding locations, a fixed gaging plane determined by and including therein said two pairs of longitudinally extended guide surfaces and said guiding locations, a first arm carried by said first slide and extending therefrom in a direction transverse to said opposed directions and said guide surfaces and along said gaging plane, a first gaging stylus for gaging the outside periphery of an article disposed on said article-carrying surface, said first stylus sensing deviations along a given line of gaging, means fixedly mounting said first stylus on said first arm disposing said stylus and its line of gaging within said fixed gaging plane, a second arm carried by said second slide and having a second gaging stylus for gaging the inside periphery of said article, said second stylus sensing deviations along a given line of gaging, and means fixedly mounting said second stylus on said second arm disposing said second stylus and its line of gaging within said fixed gaging plane, whereby through said widely spaced guiding locations within said gaging plane maximum accuracy of stylus positioning is achieved.

6. Gaging apparatus comprising, a base having an article-carrying surface, said base carrying two pairs of parallel longitudinally extended guide surfaces, a first slide carried by said base and being movable relative thereto along both pairs of guide surfaces in opposed directions by guiding association at each of its respective ends with a respective pair of said guide surfaces at widely spaced apart guiding locations, a second slide carried by said base and being movable relative thereto along both pairs of guide surfaces in said opposed directions by guiding association at each of its respective ends with a respective pair of guide surfaces, the ends of said second slide lying immediately adjacent corresponding ends of said first slide, a fixed gaging plane determined by and including therein said two pairs of longitudinally extended guide means and said guiding locations, a first arm carried by said first slide and extending therefrom in a direction transverse to said opposed directions and said guide surfaces and along said gaging plane, a first gaging stylus for gaging the outside periphery of an article disposed on said article-carrying surface, said first stylus sensing deviations along a given line of gaging, means fixedly mounting said first stylus on said first arm disposing said stylus and its line of gaging within said fixed gaging plane, a second arm carried by said second slide and having a second gaging stylus for gaging the inside periphery of said article, said second stylus sensing deviations along a given line of gaging, and means fixedly mounting said second stylus on said second arm disposing said second stylus and its line of gaging within said fixed gaging plane, whereby through said widely spaced guiding locations within said gaging plane maximum accuracy of stylus positioning is achieved.

7. Gaging apparatus comprising,
a base having an article-carrying surface, said base carrying longitudinally extended vertical guide surfaces,
a first slide guided for vertical movement along said guide surfaces in opposed directions by guiding association therewith at widely spaced apart guiding locations therealong,
a second slide guided for vertical movement along said guide surfaces in said opposed directions by guiding association therewith at widely spaced apart guiding locations therealong,
a vertical gaging plane fixed relative to said base including therein said longitudinally extended vertical guide means and said guiding locations,
actuating means supported by said base and connected to each slide in supporting relation thereto for applying actuating forces effective within said gaging plane and driving each slide independently along said vertical guide surfaces while supporting the mass thereof,
a first arm carried by said first slide and extending therefrom in a direction transverse to said opposed directions and said vertical guide surfaces and along said gaging plane,
a first gaging stylus for gaging the outside periphery of an article disposed on said article-carrying surface, said first stylus having a gaging element for association with the article being gaged responsive to displacement of the article surface relative to said first stylus along a given line of gaging for sensing deviations along this given line,
means fixedly mounting said first stylus on said first arm disposing said stylus and its line of gaging within said fixed vertical gaging plane,
a second arm carried by said second slide and having a second gaging stylus for gaging the inside periphery of said article, said second stylus having a gaging element for association with the article being gaged responsive to displacement of the article surface relative to said second stylus along a given line of gaging for sensing deviations along this given line,
and means fixedly mounting said second stylus on said second arm disposing said second stylus and its line of gaging within said fixed vertical gaging plane, whereby through said widely spaced guiding locations within said vertical gaging plane maximum accuracy of stylus positioning is achieved.

8. Gaging apparatus for measuring surfaces of revolution comprising,
a base carrying longitudinally extended vertical guide surfaces,
a first slide guided for vertical movement along said guide surfaces in opposed directions by guiding association therewith at widely spaced guiding locations therealong,
a second slide guided for vertical movement along said guide surfaces in said opposed directions by guiding association therewith at widely spaced guiding locations therealong,
a vertical gaging plane fixed relative to said base and including therein said longitudinally extended vertical guide means and said guiding locations,
actuating means supported by said base and connected to each slide in supporting relation thereto for applying actuating forces effective within said gaging plane and driving each slide independently along said vertical guide surfaces while supporting the mass thereof,
a rotary table having a vertical axis of rotation, in said vertical gaging plane,
means supporting said rotary table for rotation and horizontal movement on said base while maintaining its vertical axis in said gaging plane,
a first arm carried by said first slide for horizontal movement relative thereto along said gaging plane,
a first gaging stylus for gaging the outside periphery of an article disposed on said article-carrying surface, said first stylus having a gaging element for association with the article being gaged responsive to displacement of the article surface relative to said first stylus along a given line of gaging for sensing deviations along this given line,
means fixedly mounting said first stylus on said first arm disposing said stylus and its line of gaging within said fixed vertical gaging plane,
a second arm carried by said second slide projecting through said rotary table and having a second gaging stylus for gaging the inside periphery of said article, said second stylus having a gaging element for association with the article being gaged responsive to displacement of the article surface relative to said second stylus along a given line of gaging for sensing deviations along this given line,
and means fixedly mounting said second stylus on said second arm disposing said second stylus and its line of gaging within said fixed gaging plane, whereby through said widely spaced guiding locations within said gaging plane maximum accuracy of stylus positioning is achieved.

9. Gaging apparatus comprising,
a base having an article-carrying surface, said base carrying longitudinally extended vertical guide surfaces,
a first slide guided for vertical movement along said guide surfaces in opposed directions by guiding association therewith at widely spaced guiding locations therealong,
a second slide guided for vertical movement along said guide surfaces in said opposed directions by guiding association therewith at widely spaced guiding locations therealong,
a fixed vertical gaging plane determined by and including therein said longitudinally extended vertical guide means and said guiding locations,
actuating means supported by said base and connected to each slide in supporting relation thereto for applying actuating forces effective within said gaging plane and driving each slide independently along said vertical guide surfaces while supporting the mass thereof,
a first arm carried by said first slide and extending therefrom in a direction transverse to said opposed directions and said vertical guide surfaces and along said gaging plane,
a first gaging stylus for gaging the outside periphery of an article disposed on said article-carrying surface, said first stylus having a gaging element for association with the article being gaged responsive to displacement of the article surface relative to said first stylus, said element having its axis disposed along a line of gaging at 45° relative to said opposed directions and sensing deviations along said 45° line of gaging,
means fixedly mounting said first stylus on said first arm disposing said stylus and its line of gaging within said fixed vertical gaging plane,
a second arm carried by said second slide and having a second gaging stylus for gaging the inside periphery of said article, said second gaging stylus having a gaging element for association with the article being gaged responsive to displacement of the article surface relative to said second stylus, said element having its axis disposed along a line of gaging at 45° relative to said opposed directions and sensing deviations along said 45° line,
and means fixedly mounting said second stylus on said second arm disposing said second stylus and its line of gaging within said fixed vertical gaging plane, whereby through said widely spaced guiding locations within said vertical gaging plane maximum accuracy of stylus positioning is achieved.

References Cited by the Examiner

UNITED STATES PATENTS

| | | | |
|---|---|---|---|
| 1,381,188 | 6/1921 | Gury | 308—314 |
| 1,773,679 | 8/1930 | Jackson | 308—6 |
| 2,097,340 | 10/1937 | Plimmer | 308—3 |
| 2,397,108 | 3/1946 | Hanna | 33—174 |
| 2,761,217 | 9/1956 | King | 33—174 |

OTHER REFERENCES

American Machinist, pages 101–103, February 9, 1959.

LOUIS R. PRINCE, *Primary Examiner*.

LEONARD FORMAN, *Examiner*.